(12) United States Patent
Reissner

(10) Patent No.: US 12,281,923 B2
(45) Date of Patent: Apr. 22, 2025

(54) SYSTEM AND METHOD FOR MEASURING A FLOW OF GAS THROUGH A CHANNEL

(71) Applicant: BELIMO HOLDING AG, Hinwil (CH)

(72) Inventor: Patrick Reissner, Herrliberg (CH)

(73) Assignee: BELIMO HOLDING AG, Hinwil (CH)

( * ) Notice: Subject to any disclaimer, the term of this patent is extended or adjusted under 35 U.S.C. 154(b) by 321 days.

(21) Appl. No.: 17/774,193

(22) PCT Filed: Dec. 23, 2020

(86) PCT No.: PCT/EP2020/087759
§ 371 (c)(1),
(2) Date: May 4, 2022

(87) PCT Pub. No.: WO2021/130307
PCT Pub. Date: Jul. 1, 2021

(65) Prior Publication Data
US 2022/0373373 A1    Nov. 24, 2022

(30) Foreign Application Priority Data

Dec. 23, 2019  (CH) .................................... 01696/19

(51) Int. Cl.
*G01F 1/66* (2022.01)
*G01F 1/667* (2022.01)

(52) U.S. Cl.
CPC .............. *G01F 1/667* (2013.01); *G01F 1/662* (2013.01)

(58) Field of Classification Search
CPC .................. G01F 1/667; G01F 1/662
See application file for complete search history.

(56) References Cited

U.S. PATENT DOCUMENTS 4,515,021 A * 5/1985 Wallace .................. G01P 5/245
                                                 73/861.27
5,117,698 A    6/1992 Baumoel
(Continued)

FOREIGN PATENT DOCUMENTS

EP    1113247 A1    7/2001
GB    2 363 455 A   12/2001
(Continued)

OTHER PUBLICATIONS

Swiss Search Report of CH 16962019 dated May 4, 2020 [PCT/ISA/201].
(Continued)

*Primary Examiner* — Jamel E Williams
(74) *Attorney, Agent, or Firm* — Sughrue Mion, PLLC

(57) ABSTRACT

An HVAC flow measurement system (1) comprises an ultrasonic flowmeter (10) for measuring a flow of gas through a channel (2). The ultrasonic flowmeter (10) comprises ultrasonic transducers (11, 12) arranged at a distance from each other in flow direction (f). The ultrasonic transducers (11, 12) are configured to emit an ultrasonic pulse into the channel (2) and to receive an ultrasonic pulse in the channel (2). The flow measurement system (1) further comprises a processor (100) connected to the two ultrasonic transducers (11, 11*a*, 11*b*, 12, 12*a*, 12*b*) and configured to determine and store transit times of ultrasonic pulses propagating in and against flow direction (f) along more than one path (R1, R2) in the channel (2**), and to determine the flow of gas using the transit times.

30 Claims, 7 Drawing Sheets

(56) References Cited

U.S. PATENT DOCUMENTS

| | | | |
|---|---|---|---|
| 5,553,505 A | 9/1996 | Bignell et al. | |
| 6,330,831 B1* | 12/2001 | Lynnworth | G01F 1/662 73/861.28 |
| 6,345,539 B1 | 2/2002 | Rawes et al. | |
| 6,494,105 B1* | 12/2002 | Gallagher | G01F 1/662 73/861.27 |
| 6,584,860 B1 | 7/2003 | Feller et al. | |
| 7,201,065 B1* | 4/2007 | Feller | G01F 15/00 73/861.27 |
| 7,581,453 B2* | 9/2009 | Ao | G01F 1/663 73/861.27 |
| 8,302,455 B2 | 11/2012 | Straub, Jr. | |
| 9,453,749 B1* | 9/2016 | Bachmann | G01F 1/662 |
| 9,671,261 B2 | 6/2017 | Hayashi | |
| 10,036,763 B2 | 7/2018 | Hies et al. | |
| 10,837,816 B2 | 11/2020 | Mayle et al. | |
| 10,928,414 B2 | 2/2021 | Hies et al. | |
| 11,237,034 B2 | 2/2022 | Funck | |
| 11,268,725 B2 | 3/2022 | Chen et al. | |
| 2008/0156107 A1 | 7/2008 | Ao et al. | |
| 2010/0095782 A1 | 4/2010 | Ferencz et al. | |
| 2011/0162461 A1* | 7/2011 | Allen | G01F 1/662 310/317 |
| 2012/0204620 A1* | 8/2012 | Straub, Jr. | G01F 1/66 73/1.16 |
| 2014/0067135 A1 | 3/2014 | Lehnert et al. | |
| 2014/0083202 A1* | 3/2014 | Wiest | G01F 1/662 73/861.27 |
| 2014/0352399 A1* | 12/2014 | Vaissiere | G01F 1/662 73/1.34 |
| 2016/0265954 A1 | 9/2016 | Bachmann et al. | |
| 2017/0153132 A1 | 6/2017 | Aughton | |
| 2018/0328956 A1* | 11/2018 | Hies | G01P 5/244 |
| 2019/0011300 A1* | 1/2019 | Gloss | G01F 25/10 |
| 2020/0141604 A1 | 5/2020 | Chen et al. | |
| 2020/0173824 A1 | 6/2020 | Funck | |
| 2022/0373373 A1 | 11/2022 | Reissner | |
| 2022/0381595 A1 | 12/2022 | Reissner | |
| 2022/0381596 A1 | 12/2022 | Reissner | |

FOREIGN PATENT DOCUMENTS

| | | | | |
|---|---|---|---|---|
| JP | 2005-241581 A | 9/2005 | | |
| JP | 2012-002625 A | 1/2012 | | |
| JP | 2014-137369 A | 7/2014 | | |
| WO | 2010/122117 A1 | 10/2010 | | |
| WO | 2015/063079 A1 | 5/2015 | | |
| WO | WO-2015154777 A1 * | 10/2015 | | F16K 1/221 |
| WO | 2018/233984 A1 | 12/2018 | | |
| WO | 2019/010603 A1 | 1/2019 | | |

OTHER PUBLICATIONS

International Search Report of PCT/EP2020/087759 dated Apr. 16, 2021 [PCT/ISA/210].
Written Opinion of PCT/EP2020/087759 dated Apr. 16, 2021 [PCT/ISA/237].
Communication issued Apr. 18, 2024 in European Application No. 20 838 557.5.
Communication issued Apr. 22, 2024 in European Application No. 20 838 556.7.
Office Action issued May 31, 2024 in U.S. Appl. No. 17/774,407.
International Search Report for PCT/EP2020/087761 dated Apr. 12, 2021 [PCT/ISA/210].
Written Opinion for PCT/EP2020/087761 dated Apr. 12, 2021 [PCT/ISA/237].
Communication issued Apr. 18, 2024 in European Application No. 20 838 558.3.
Office Action issued Apr. 24, 2024 in U.S. Appl. No. 17/774,261.
Office Action issued Jul. 12, 2024 in U.S. Appl. No. 17/774,261.
International Search Report of PCT/EP2020/087760 dated Apr. 7, 2021 [PCT/ISA/210].
Written Opinion of PCT/EP2020/087760 dated Apr. 7, 2021 [PCT/ISA/237].
Chinese Office Action dated Jan. 26, 2025 in Application No. 202080088622.8.

* cited by examiner

SYSTEM AND METHOD FOR MEASURING A FLOW OF GAS THROUGH A CHANNEL

CROSS REFERENCE TO RELATED APPLICATIONS

This application is a National Stage of International Application No. PCT/EP2020/087759, filed Dec. 23, 2020, claiming priority to Swiss Patent Application No. 01696/19, filed Dec. 23, 2019, the contents of each of which being herein incorporated by reference in their entireties.

FIELD OF THE INVENTION

The present invention relates to system and method for measuring the flow of gas through a channel. Specifically, the present invention relates to a flow measurement system and a method of measuring a flow of gas through a channel, using an ultrasonic flowmeter.

BACKGROUND OF THE INVENTION

WO 2010/122117 describes a ventilation system which draws air from an exterior of a building through a ventilation duct into an interior of the building. The ventilation system has an ultrasound sensor positioned in the ventilation duct upstream and/or downstream of the ventilator for measuring the volume flow. The ultrasound sensor of WO 2010/122117 comprises a pair of ultrasonic transceivers which are mounted in a spaced apart relationship facing each other on opposing surfaces of the ventilation duct, emitting and receiving ultrasound waves in an angle of 60-90 degrees relative to the surface of the ventilation duct.

SUMMARY OF THE INVENTION

It is an object of this invention to provide a system and a method for measuring the flow of gas through a channel, using ultrasonic transducers, which system and method do not have at least some of the disadvantages of the prior art. In particular, it is an object of the present invention to provide a system and a method for measuring the flow of gas through a channel, using ultrasonic transducers, which system and method make it possible to increase coverage and accounting for different flow profiles, in order to measure with a good accuracy, the average flow over different channel profiles.

According to the present invention, these objects are achieved through the features of the independent claims. In addition, further advantageous embodiments follow from the dependent claims and the description.

According to the present invention, the above-mentioned objects are particularly achieved in that an ultrasonic flowmeter of a flow measurement system for measuring a flow of gas through a channel, comprises at least two ultrasonic transducers which are arranged at a distance from each other in flow direction, when the ultrasonic flowmeter is fixed to the channel, and configured to emit an ultrasonic pulse into the channel and to receive an ultrasonic pulse in the channel. The flow measurement system further comprises a processor which is connected to the two ultrasonic transducers and configured to determine and store the transit times of ultrasonic pulses propagating in and against flow direction along more than one path in the channel, and to determine the flow of gas using the transit times. Measuring the transit times of ultrasonic pulses along a plurality of paths makes it possible to increase coverage and factoring in of the flow profile of the channel for improved measurement accuracy.

Further according to the present invention, the above-mentioned objects are particularly achieved in that an ultrasonic flowmeter of a flow measurement system for measuring a flow of gas through a channel, comprises two ultrasonic transducers which are arranged at a distance from each other in flow direction, when the ultrasonic flowmeter is fixed to the channel, and configured to emit an ultrasonic pulse into the channel and to receive an ultrasonic pulse in the channel along more than one path or along a plurality of paths. The flow measurement system further comprises a processor which is connected to the two ultrasonic transducers and configured to determine and store the transit times of ultrasonic pulses propagating in and against flow direction along the more than one path or the plurality of paths in the channel, and to determine the flow of gas using the transit times. Measuring the transit times of ultrasonic pulses along a plurality of paths makes it possible to increase coverage and factoring in of the flow profile of the channel for improved measurement accuracy.

In an embodiment, the at least two or exactly two ultrasonic transducers are configured to receive at least one reflection of an ultrasonic pulse in the channel, and the processor is configured to determine and store transit times of ultrasonic pulses propagating in and against flow direction along one or more reflection paths, each reflection path running via one or more reflection point on an inside wall of the channel, and to determine the flow of gas using the transit times.

In an embodiment, the processor of the flow measurement system is configured to determine and store the transit times of ultrasonic pulses propagating in and against flow direction along a plurality of reflection paths of a plurality of reflections of an ultrasonic pulse emitted by one of the ultrasonic transducers on a plurality of reflection points on the inside wall of the channel. Measuring the transit times of ultrasonic pulses along a plurality of reflection paths of a plurality of reflections of an ultrasonic pulse emitted by one of the ultrasonic transducers makes it possible to improve measurement accuracy and reliability because sensitivity to fouling in the channel is reduced.

In an embodiment, the processor of the flow measurement system is configured to determine and store the transit times of ultrasonic pulses propagating in and against flow direction along a plurality of reflection paths of a plurality of ultrasonic pulses emitted by different ultrasonic transducers. Measuring the transit times of ultrasonic pulses along a plurality of reflection paths of a plurality of ultrasonic pulses emitted by different ultrasonic transducers makes it possible to increase coverage and factoring in of the cross section of the channel for improved measurement accuracy, particularly in channels with large cross sections such as air supply entry passages.

In an embodiment, the processor of the flow measurement system is configured to determine the flow of gas further using signal strength values of the received ultrasonic pulses.

In an embodiment, the processor of the flow measurement system is configured to exclude the transit times of ultrasonic pulses received via a particular reflection path in determining the flow of gas, if a signal strength value of the reflection via the particular reflection path is below a set threshold value. Excluding measurements with low signal strength values makes it possible to detect and ignore reflection paths via permanently or temporarily fouled reflection points.

In an embodiment, the processor of the flow measurement system is configured to generate an alarm, if the signal strength of the ultrasonic pulses received via all the paths is below a certain threshold.

In an embodiment, the processor of the flow measurement system is configured to determine a flow profile of the channel, using the transit times, and determine the flow of gas using the flow profile. The determined flow profile makes it possible to determine the flow of gas depending on the detected flow profile.

In an embodiment, the flow measurement system further comprises the channel, the ultrasonic flowmeter is fixed to the channel, and a damper system has a damper blade arranged in the channel downstream of the ultrasonic flowmeter.

In an embodiment, the damper blade is rotatable about a damper rotation axis which divides a cross section of the channel into a first half and a second half, and the ultrasonic transducers are arranged on a same side of the channel forming either the first half of the cross section or the second half of the cross section.

In an embodiment, the damper blade is rotatable about a damper rotation axis which divides a cross section of the channel into an upper half and a lower half, whereby in the upper half of the cross section the damper blade is movable downstream in flow direction and in the lower half of the cross section the damper blade is movable upstream against the flow direction, and the ultrasonic transducers are arranged on a side of the channel forming the upper half of the cross section.

In an embodiment, the ultrasonic transducers are arranged on a side of the channel along a longitudinal arrangement axis running in a symmetry plane of the damper blade normal to a damper rotation axis.

In an embodiment, the ultrasonic transducer arranged downstream in the flow direction is arranged at a defined distance between its center axis and a cross sectional plane running through the damper blade in closed position, whereby the defined distance is within a range of 75% to 125% of a diameter of the channel.

In an embodiment, the ultrasonic transducers are arranged on a side of the channel along a longitudinal arrangement axis parallel to a central axis of the channel.

In an embodiment, the processor of the flow measurement system is configured to determine a temperature of the gas using the transit times.

In an embodiment, the flow measurement system further comprises a temperature sensor configured to determine a temperature of the gas in the channel, and the processor is configured to determine a diameter or width of the channel, using the transit times and the temperature of the gas.

In a further aspect of the invention, or in embodiments relating to the other aspects of the invention disclosed herein, a flow measurement system is disclosed, which comprises an ultrasonic flowmeter for measuring a flow of gas through a channel, the ultrasonic flowmeter comprising at least two ultrasonic transducers arranged at a distance from each other in flow direction (f) and/or in a direction normal to the flow direction (f), when the ultrasonic flowmeter is fixed to the channel, and configured to emit an ultrasonic pulse into the channel and to receive an ultrasonic pulse in the channel along more than one path, and a processor connected to the two ultrasonic transducers, wherein the processor is configured to determine and store transit times of ultrasonic pulses propagating in and against the flow direction (f) along the more than one path in the channel, and to determine the flow of gas using the transit times, wherein the flow measurement system comprises a plurality of ultrasonic flowmeters arranged on a same wall at a distance (e) in a direction normal to the flow direction.

In embodiments of such a flow measurement system, each of the ultrasonic flowmeters uses the ultrasonic transducers to detect ultrasonic pulse paths with single reflections at a single reflection point on the inside of the opposite wall of the channel.

In further embodiments of such a flow measurement system, in addition to ultrasonic transducers of a first ultrasonic flowmeter detecting ultrasonic pulses along reflection paths, e.g. reflection paths with single reflections, of ultrasonic pulses emitted by an ultrasonic transducer of the same first ultrasonic flowmeter, the ultrasonic transducers are further configured to detect reflections of ultrasonic pulses along reflection paths, for which the ultrasonic pulses are emitted by an ultrasonic transducer of a different second ultrasonic flowmeter.

In a further aspect of the invention, or in embodiments comprising reflection paths in channels having edges, at least one reflection point for a reflection path can be implemented by a reflecting area of an edge region formed by at least two inside walls of the channel. This has the advantage that an already existing edge of the channel can be used as an efficient reflector for ultrasonic waves with good directional or collimating retroreflecting properties. Preferably, the edge region is formed in a joining region of two or three substantially mutually vertical walls of the channel, thereby using the edge region as a cornercube reflector for the ultrasonic waves.

In addition to the flow measurement system, the present invention also relates to a method of measuring a flow of gas through a channel, using an ultrasonic flowmeter which comprises at least two ultrasonic transducers and a processor connected to the two ultrasonic transducers. The method comprises fixing the ultrasonic flowmeter to the channel such that the two ultrasonic transducers are arranged at a distance from each other in flow direction and configured to emit an ultrasonic pulse into the channel and to receive an ultrasonic pulse in the channel. The method further comprises the processor determining and storing transit times of ultrasonic pulses propagating in and against flow direction along more than one path in the channel, and determining the flow of gas using the transit times.

Further in addition to the flow measurement system, the present invention also relates to a method of measuring a flow of gas through a channel, using an ultrasonic flowmeter which comprises two ultrasonic transducers and a processor connected to the two ultrasonic transducers. The method comprises fixing the ultrasonic flowmeter to the channel such that the two ultrasonic transducers are arranged at a distance from each other in flow direction and configured to emit an ultrasonic pulse into the channel and to receive an ultrasonic pulse in the channel along more than one path or along a plurality of paths. The method further comprises the processor determining and storing transit times of ultrasonic pulses propagating in and against flow direction along the more than one path in the channel, and determining the flow of gas using the transit times.

In an embodiment, the at least two or exactly two ultrasonic transducers are configured to receive at least one reflection of an ultrasonic pulse in the channel, and the method comprises the processor determining and storing transit times of ultrasonic pulses propagating in and against flow direction along one or more reflection paths, each reflection path running via one or more reflection point on an inside wall of the channel, and determining the flow of gas using the transit times.

In an embodiment, the method comprises the processor determining and storing the transit times of ultrasonic pulses propagating in and against flow direction along a plurality of reflection paths of a plurality of reflections of an ultrasonic pulse emitted by one of the ultrasonic transducers on a plurality of reflection points on the inside wall of the channel.

In an embodiment, the method comprises the processor determining and storing the transit times of ultrasonic pulses propagating in and against flow direction along a plurality of reflection paths of a plurality of ultrasonic pulses emitted by different ultrasonic transducers.

In an embodiment, determining the flow of gas comprises the processor further using signal strength values of the received ultrasonic pulses.

In an embodiment, the method comprises the processor excluding the transit times of ultrasonic pulses received via a particular reflection path in determining the flow of gas, if a signal strength value of the reflection via the particular reflection path is below a set threshold value.

In an embodiment, the method comprises the processor generating an alarm, if the signal strength of the ultrasonic pulses received via all the paths is below a certain threshold.

In an embodiment, the method further comprises the processor determining a flow profile of the channel, using the transit times, and determining the flow of gas comprises the processor using the flow profile.

In an embodiment, the method further comprises the processor determining a temperature of the gas using the transit times.

In an embodiment, the flow measurement system further comprises a temperature sensor configured to determine a temperature of the gas in the channel, and the method further comprises the processor determining a diameter or width of the channel, using the transit times and the temperature of the gas.

In addition to the flow measurement system and the method of measuring a flow of gas through a channel, the present invention also relates to a computer program product comprising a non-transitory computer-readable medium having stored thereon computer program code configured to control a processor of an ultrasonic flowmeter for measuring a flow of gas through a channel, the ultrasonic flowmeter comprising at least two ultrasonic transducers connected to the processor and arranged at a distance from each other in flow direction, when the ultrasonic flowmeter is fixed to the channel, and configured to emit an ultrasonic pulse into the channel and to receive an ultrasonic pulse in the channel. The computer program code is configured to control the processor, such that processor determines and stores the transit times of ultrasonic pulses propagating in and against flow direction along more than one path in the channel, and determines the flow of gas using the transit times.

Further in addition to the flow measurement system and the method of measuring a flow of gas through a channel, the present invention also relates to a computer program product comprising a non-transitory computer-readable medium having stored thereon computer program code configured to control a processor of an ultrasonic flowmeter for measuring a flow of gas through a channel, the ultrasonic flowmeter comprising two ultrasonic transducers connected to the processor and arranged at a distance from each other in flow direction, when the ultrasonic flowmeter is fixed to the channel, and configured to emit an ultrasonic pulse into the channel and to receive an ultrasonic pulse in the channel along more than one path or along a plurality of paths. The computer program code is configured to control the processor, such that the processor determines and stores the transit times of ultrasonic pulses propagating in and against flow direction along the more than one path in the channel, and determines the flow of gas using the transit times.

In embodiments, the stored computer program code is configured to control a processor of an ultrasonic flowmeter of the flow measurement system as disclosed herein, or to control a processor for performing method steps in the method as disclosed herein.

In addition to the flow measurement system and the method of measuring a flow of gas through a channel, the present invention also relates to a variable air volume system (VAV) for heating, ventilating, and air conditioning (HVAC), which variable air volume system comprises a flow measurement system as outlined above.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
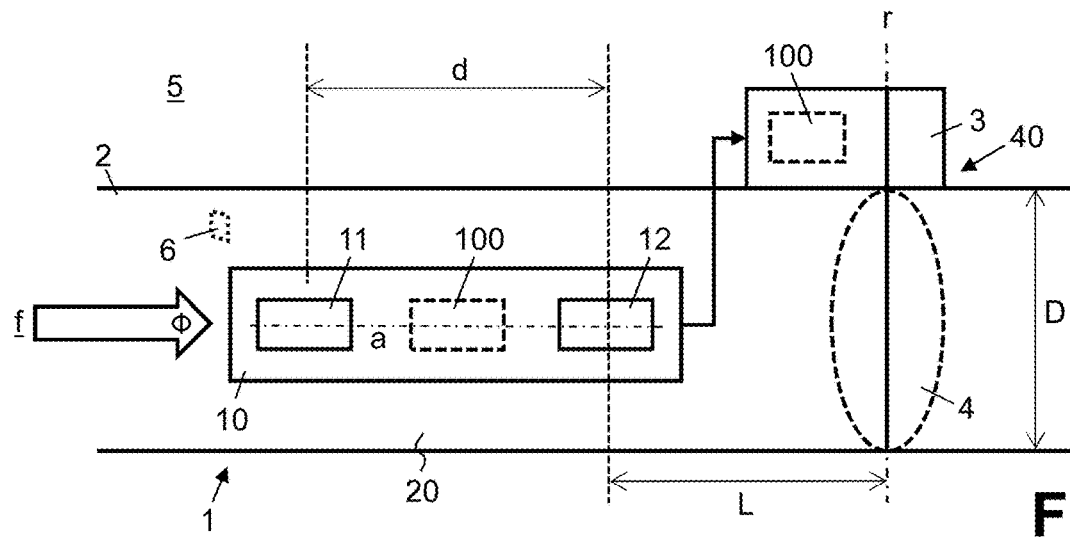
FIG. 1: shows a block diagram illustrating schematically in a cross-sectional side view a channel for transporting gas having attached thereon an ultrasonic flowmeter and an optional damper system.

In FIGS. 1-8, reference numeral 1 refers to a flow measurement system for measuring a flow Φ of gas, e.g. air, through a channel 2; particularly, an HVAC flow measurement system for heating, ventilating, and air conditioning (HVAC). The channel 2 is a gas (air) conduit, a gas (air) pipe, or a gas (air) entry passage, for example. The channel 2 has a cross-sectional profile of round, square or rectangular shape. In the embodiments illustrated in FIGS. 1-7, the channel 2 has a round cross-sectional profile with a diameter D. The flow measurement system 1 comprises one or more ultrasonic flowmeters 10, 10a, 10b fixed to the channel 2, e.g. arranged on a wall of the channel 2. The ultrasonic flowmeter 10 comprises at least two ultrasonic transducers 11, 12, 11a, 12a, 11b, 12b, configured to emit an ultrasonic pulse into the channel 2 and to receive an ultrasonic pulse in the channel 2 along one or more paths, direct paths, without any intermediate reflection, and/or reflection paths, via one or more reflection points.

Figure 2:
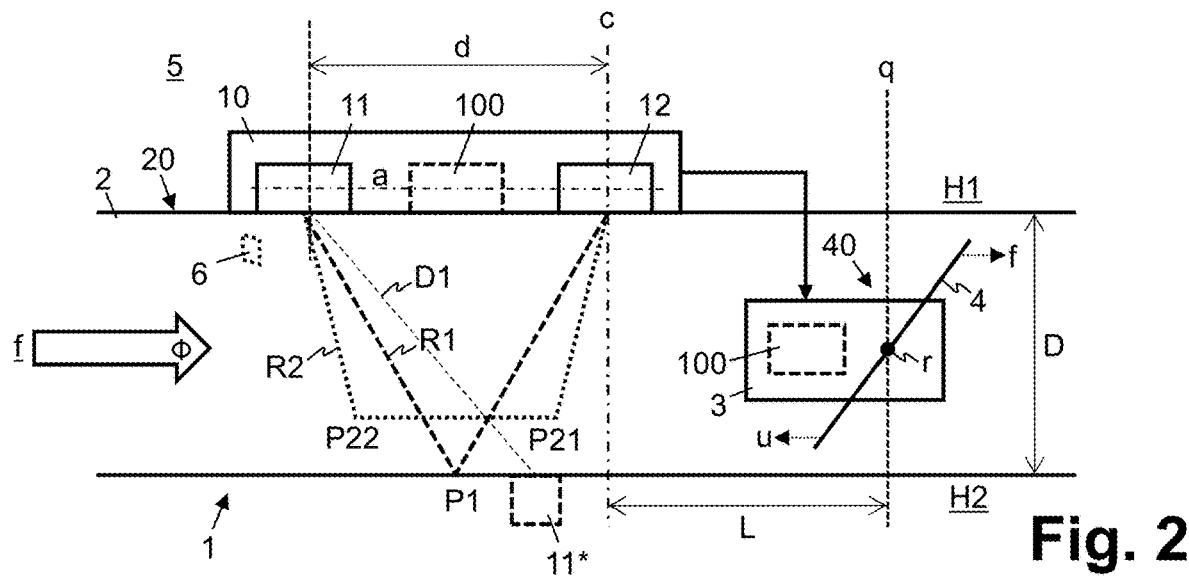
FIG. 2: shows a block diagram illustrating schematically in a cross-sectional top view a channel for transporting gas having attached thereon an ultrasonic flowmeter with two reflection paths of ultrasonic pulses and an optional damper system.
Figure 3:
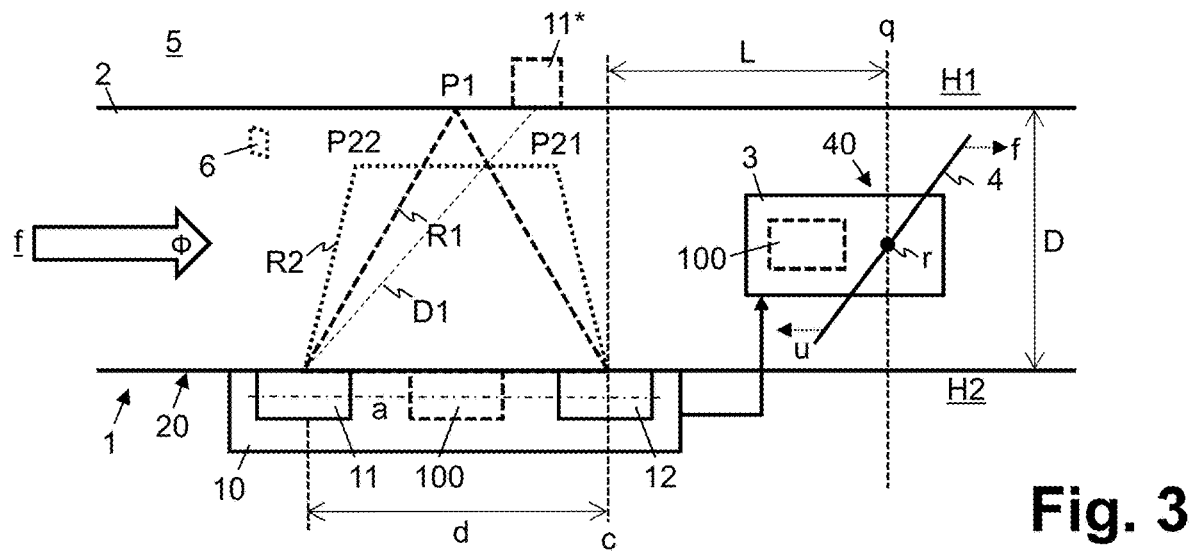
FIG. 3: shows a block diagram illustrating schematically in a cross-sectional top view a channel for transporting gas having attached thereon in an alternate arrangement an ultrasonic flowmeter with two reflection paths of ultrasonic pulses and an optional damper system.
Figure 8:
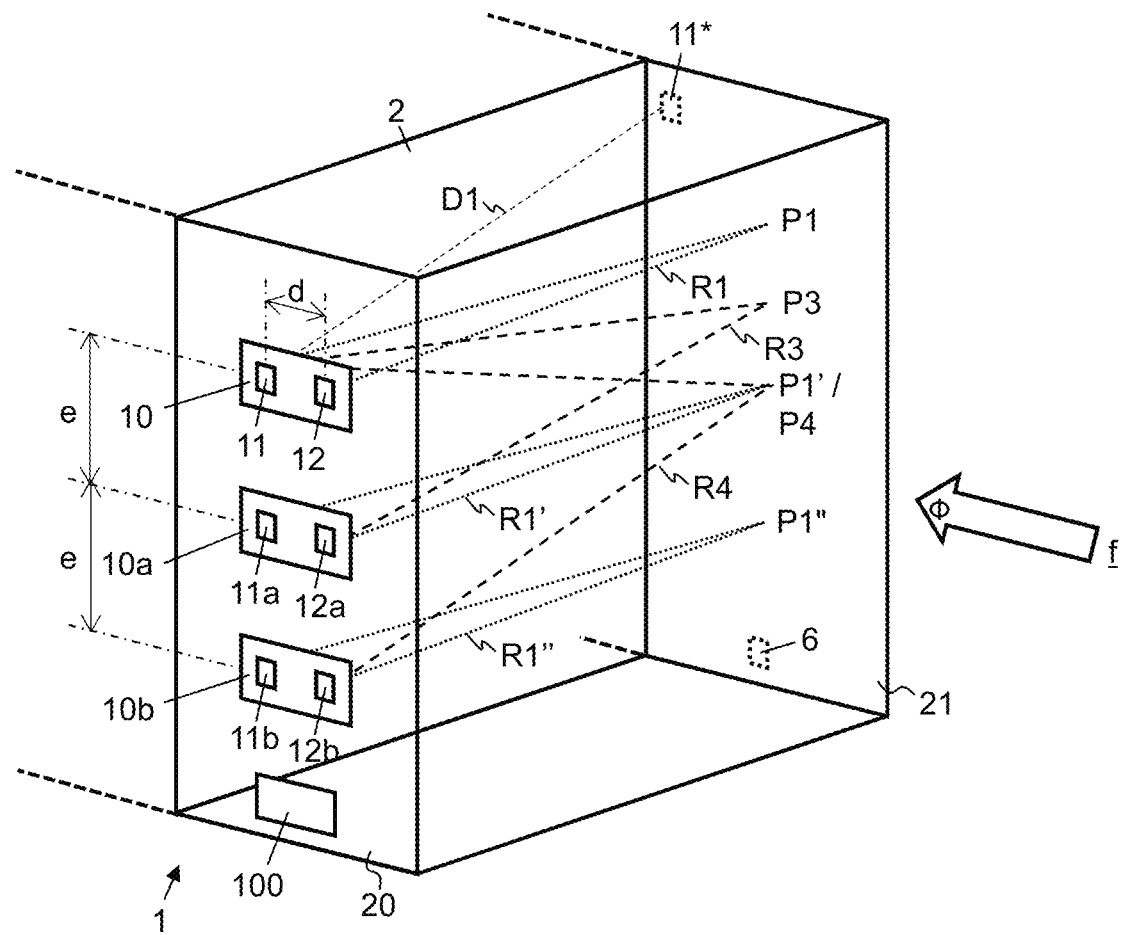
FIGS. 8, 8b, 8c: show block diagrams illustrating schematically in a three-dimensional or two-dimensional view a channel for transporting gas having attached thereon three ultrasonic flowmeters with individual reflections paths of ultrasonic pulses.

As illustrated in FIGS. 2, 3, 6, 7, and 8, the ultrasonic transducers 11, 12, 11a, 12a, 11b, 12b are configured to receive at least one reflection of an ultrasonic pulse in the channel 2, specifically a reflection of an ultrasonic pulse on one or more reflection points P1, P1', P1", P21, P22, P3, P4 on an inside wall 20, 21 of the channel 2 and propagating along a reflection path R1, R1', R1", R2, R3, R4 via the one or more reflection points P1, P1', P1", P21, P22, P3, P4. As illustrated in FIGS. 2, 3, and 8, arranging one or more ultrasonic transducers 11, 11* on opposite walls of the channel 2 makes it possible to transmit and receive ultrasonic pulses via a direct path D1.

In the following description, reference is made primarily to reflection paths R1, R1', R1", R2, R3, R4 via one or more reflection points P1, P1', P1", P21, P22, P3, P4; nevertheless, one skilled in the art will understand that a plurality a paths, for measuring the transit times of ultrasonic pulses propagating in and against flow direction f, can be implemented using a plurality of direct paths D1, a plurality of reflection paths R1, R1', R1", R2, R3, R4, or a combination of one or more direct paths D1 and one or more reflection paths R1, R1', R1", R2, R3, R4. Preferably, at least one path is a reflection path R1, R1', R1", R2, R3, R4.

In an embodiment, a damper system 40 is arranged in the channel 2. As illustrated in FIGS. 1-6, the damper system 40 comprises a damper blade 4 which is arranged inside the channel 2, rotatable about a rotation axis r to adjust the orifice of the channel 2 and thereby regulate the flow Φ of gas through the channel 2. The damper system 40 and its damper blade 4 are arranged in the channel 2 downstream of the ultrasonic flowmeter 10 and its ultrasonic transducers 11, 12. The rotation axis r of the damper blade 4 divides the cross section of the channel 2 into two halves H1, H2.

Figure 6:
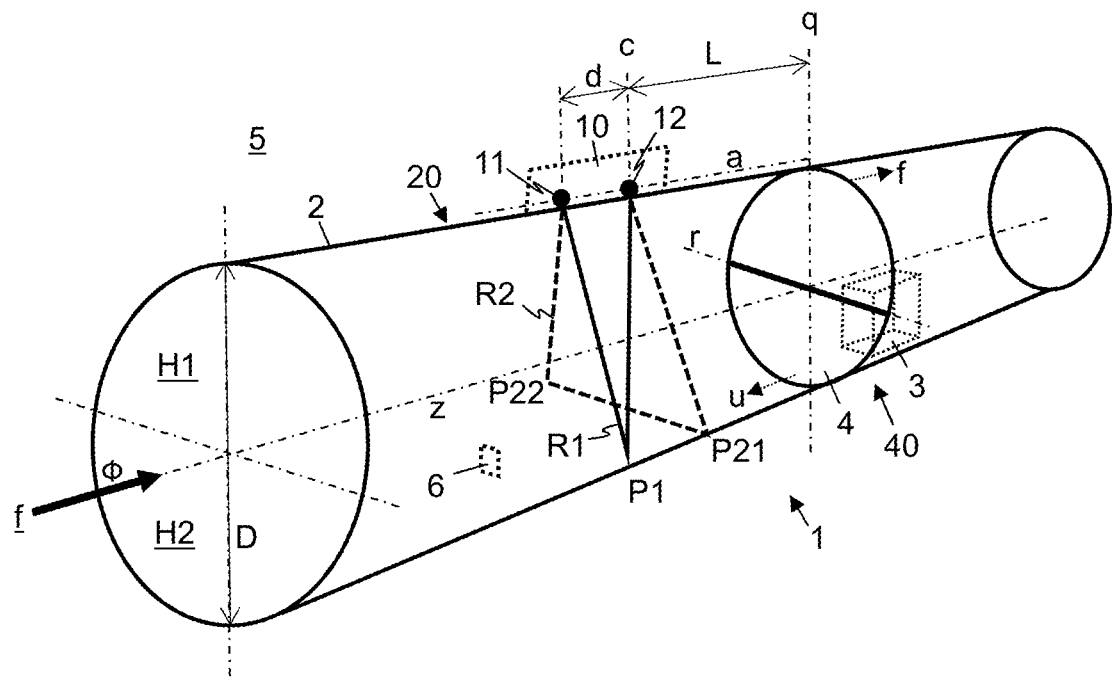
FIG. 6: shows a block diagram illustrating schematically in a three-dimensional view a channel for transporting gas having attached thereon an ultrasonic flowmeter with two reflection paths of ultrasonic pulses and an optional damper system.
Figure 7:
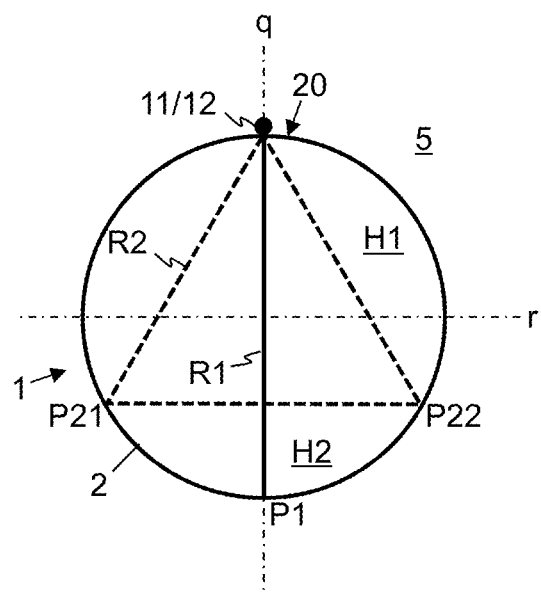
FIG. 7: shows a block diagram illustrating schematically a cross-section of a channel for transporting gas and two reflection paths of ultrasonic pulses.

As illustrated in FIGS. 2, 3, and 6, in one of the two halves H1, herein defined as the upper half H1, the damper blade 4 is movable downstream in flow direction f. In the other one of the two halves H2, herein defined as the lower half H2, the damper blade 4 is movable upstream u against the flow direction f. The ultrasonic transducers 11, 12 are arranged on the same side of the channel 2 forming either of the two halves H1, H2.

Figure 4:
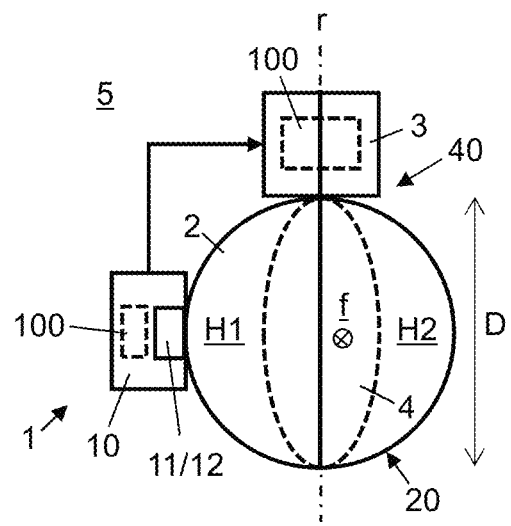
FIG. 4: shows a block diagram illustrating schematically a cross-section of a channel for transporting gas having attached thereon an ultrasonic flowmeter with two reflection paths of ultrasonic pulses and an optional damper system.
Figure 5:
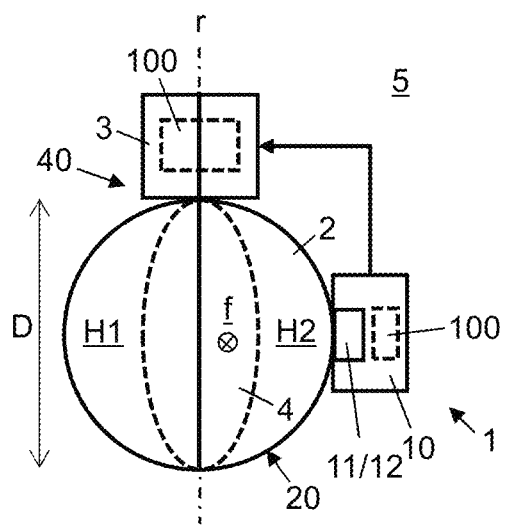
FIG. 5: shows a block diagram illustrating schematically a cross-section of a channel for transporting gas having attached thereon in an alternate arrangement an ultrasonic flowmeter with two reflection paths of ultrasonic pulses and an optional damper system.

In the embodiments illustrated in FIGS. 3 and 5, the ultrasonic transducers 11, 12 are arranged on the side of the channel 2 which forms the lower half H2, i.e. the side where the damper 4 is movable upstream u against the flow direction f. Preferably, as will be explained later with reference to measurement results illustrated in FIGS. 9 and 10, the ultrasonic transducers 11, 12 are arranged on the side of the channel 2 which forms the upper half H1, i.e. the side where the damper 4 is movable downstream in the flow direction f, as illustrated in FIGS. 2, 4, and 6.

In FIGS. 1-7, reference numeral 5 refers to a variable air volume (VAV) system (also referred to as "VAV device" or "VAV box") for heating, ventilating, and air conditioning (HVAC), which VAV system 5 comprises the flow measurement system 1 and the damper system 40. The VAV box controls the air volume on a given setpoint derived from any mathematical combination of the temperature and measured flow in the supply and return air (and in the room (e.g. from a room sensor)).

As illustrated in FIGS. 1, 2, 3, and 6, the ultrasonic transducers 11, 12 are arranged on the same side of the channel 2, along a longitudinal arrangement axis a which runs parallel to the central axis z of the channel 2. More specifically, the ultrasonic transducers 11, 12 are arranged along a longitudinal arrangement axis a which runs parallel to the central axis z of the channel 2, in a symmetry plane q/z of the damper blade 4, normal to the rotation axis r of the damper blade 4.

As illustrated in FIGS. 1, 2, 3, and 6, the ultrasonic transducer 12 arranged downstream in the flow direction f is arranged at a defined distance L to the damper blade 4. More specifically, the ultrasonic transducer 12 is arranged at a distance L between its center axis c and a cross sectional plane q/r which runs through the damper blade 4 in closed position. Preferably, as will be explained later with reference to measurement results illustrated in FIG. 11, the defined distance L from the downstream ultrasonic transducer 12 is within a range of 75% to 125% of the diameter D of the channel 2.

In a further embodiment, the damper system 40 comprises an actuator 3 with an electric motor coupled to the damper blade 4 to drive the damper blade 4 between open and closed positions.

As illustrated in FIGS. 1, 2, 3, 4, 5, 6, and 8, the flow measurement system 1 further comprises a processor 100 connected to the ultrasonic transducers 11, 12, 11a, 12a, 11b, 12b of the ultrasonic flowmeters 10, 10a, 10b. As indicated in FIGS. 1, 2, 3, 4, 5, the processor 100 is arranged in the ultrasonic flowmeter 10, e.g. in a common housing together with the ultrasonic transducers 11, 12, or external to the ultrasonic flowmeters 10, 10a, 10b, separate from the ultrasonic transducers 11, 12, 11a, 12a, 11b, 12b, e.g. in or on a housing of an actuator 3 of the damper system 40. In an embodiment, the processor 100 is connected to the actuator 3 of the damper system 40 for controlling operation of the actuator 3 or its electric motor, respectively, such as to drive the damper blade 4 to adjust the orifice of the channel 2 and control the flow Φ of gas through the channel 2.

The processor 100 comprises an electronic circuit and is configured to perform various functions and steps as described below in more detail. Depending on the embodiment, the electronic circuit of the processor 100 is controlled by a software program code stored on a computer-readable non-transitory computer medium, the electronic circuit comprises an application specific integrated circuit (ASIC), and/or the electronic circuit comprises discrete electronic components.

In the embodiment of FIG. 8, the flow measurement system 1 comprises a plurality of ultrasonic flowmeters 10, 10a, 10b (e.g. three) arranged on the same wall 20 at a distance e in a direction normal to the direction of flow f.

As illustrated in FIGS. 2, 3, 6, 7, and 8, the ultrasonic transducers 11, 12, 11a, 12a, 11b, 12b of the ultrasonic flowmeters 10, 10a, 10b are arranged and configured to not only emit ultrasonic pulses into the channel 2, but also to receive reflections of ultrasonic pulses on reflection points P1, P1', P1", P21, P22, P3, P4 on an inside wall 20, 21 of the channel 2 and propagating along respective reflection paths R1, R1', R1", R2, R3, R4. FIGS. 2, 3, 6, and 7 illustrate a reflection path R1 of an ultrasonic pulse with a single reflection, at a single reflection point P1 on the inside wall 20 of the channel 2, and a reflection path R2 of the ultrasonic pulse with twofold reflection R2, at two reflection points P21, P22 on the inside wall 20 of the channel 2. Nevertheless, further reflection paths of ultrasonic pulses with three- or more reflections on three or more reflection points on the inside wall 20 of the channel 2 may detected by the receiving ultrasonic transducer 11, 12, 11a, 12a, 11b, 12b as emitted by the emitting ultrasonic transducer 11, 12, 11a, 12a, 11b, 12b of the ultrasonic flowmeter 10, 10a, 10b. In the embodiment of FIG. 8, each of the ultrasonic flowmeters 10, 10a, 10b uses the ultrasonic transducer 11, 12, 11a, 12a, 11b, 12b to detect ultrasonic pulse paths with single reflections R1, R1', R1", R3, R4 at a single reflection point P1, P1', P1", P3, P4 on the inside of the opposite wall 21 of the channel 2. As further illustrated in FIG. 8, in addition to ultrasonic transducers 11, 12, 11a, 12a, 11b, 12b of a first ultrasonic flowmeter 10, 10a, 10b detecting ultrasonic pulses along reflection paths R1, R1', R1" with single reflections R1, R1', R1" of ultrasonic pulses emitted by an ultrasonic transducer 11, 12, 11a, 12a, 11b, 12b of the same first ultrasonic flowmeter 10, 10a, 10b, the ultrasonic transducers 11, 12, 11a, 12a, 11b, 12b are further configured to detect reflections of ultrasonic pulses along reflection paths R3, R4, whereby the ultrasonic pulses are emitted by an ultrasonic transducer 11, 12, 11a, 12a, 11b, 12b of a different second ultrasonic flowmeter 10, 10a, 10b.

The processor 100 or its electronic circuit, respectively, is configured to control the ultrasonic transducers 11, 12, 11a, 12a, 11b, 12b to emit an ultrasonic pulse.

The processor 100 or its electronic circuit, respectively, is further configured to receive from the ultrasonic transducers 11, 12, 11a, 12a, 11b, 12b reflections or reflection signals of an ultrasonic pulse detected by the respective ultrasonic transducers 11, 12, 11a, 12a, 11b, 12b.

The processor 100 or its electronic circuit, respectively, is further configured to determine and store the transit times of ultrasonic pulses propagating along reflection paths R1, R1', R1", R2, R3, R4, from the emitting ultrasonic transducer 11, 12, 11a, 12a, 11b, 12b to the receiving ultrasonic transducer 11, 12, 11a, 12a, 11b, 12b, via one or more reflection points P1, P1', P1", P21, P22, P3, P4 on an inside wall 20, 21 of the channel 2.

The processor 100 or its electronic circuit, respectively, is further configured to determine the flow of gas $\Phi$ using downstream transit times $t_{down}$ of ultrasonic pulses propagating in flow direction f and upstream transit times $t_{up}$ of ultrasonic pulses propagating against flow direction f, along one or more reflection paths R1, R1', R1", R2, R3, R4 via one or more reflection points P1, P1', P1", P21, P22, P3, P4 on an inside wall 20, 21 of the channel 2. Specifically, the flow of gas $\Phi$ is determined from the average velocity of an ultrasonic pulse on a particular reflection path R1, R1', R1", R2, R3, R4, by averaging the time differences $\Delta t = t_{down} - t_{up}$ in the respective downstream transit time $t_{down}$ and upstream transit times $t_{up}$ of the ultrasonic pulse propagating along the particular reflection path R1, R1', R1", R2, R3, R4, from the emitting ultrasonic transducer 11, 12, 11a, 12a, 11b, 12b to the receiving ultrasonic transducer 11, 12, 11a, 12a, 11b, 12b.

For increased accuracy, the processor 100 or its electronic circuit, respectively, is configured to determine the flow of gas $\Phi$ using the downstream transit times $t_{down}$ and the upstream transit times $t_{up}$ of ultrasonic pulses along more than one reflection paths R1, R1', R1", R2, R3, R4, e.g. along a reflection path R1, R1', R1", R3, R4 with a single reflection at one reflection point P1, P1', P1", P3, P4 and along one or more further reflection paths R2 with multiple reflections at more than one reflection point P21, P22. For example, the velocity or flow $\Phi$ of gas determined from measurements of downstream and upstream transit times $t_{down}$, $t_{up}$ of ultrasonic pulses along multiple reflection paths R1, R1', R1", R2, R3, R4 are averaged. In an embodiment, a (weighted) average is used, for example using correction or weighting factors derived from the flow profile of the channel 2. For the latter example, the processor 100 or its electronic circuit, respectively, is configured to determine the flow profile in the channel 2, e.g. a laminar, Poiseuille, turbulent or another flow profile, from the transit times of ultrasonic pulses measured via a plurality of different paths R1, R1', R1", R2, R3, R4 in the channel 2. In an embodiment, the processor 100 or its electronic circuit, respectively, is configured to use the determined flow profile for determining the flow $\Phi$ of gas, e.g. by multiplying the determined flow $\Phi$ (or the measurements of the transit times) by a correction factor dependent on the determined flow profile.

In an embodiment, the processor 100 or its electronic circuit, respectively, is configured to determine the flow $\Phi$ of gas further using the signal strengths of the detected reflections, i.e. the signal strengths of the ultrasonic pulses received and detected by the ultrasonic transducers 11, 12, 11a, 12a, 11b, 12b via the reflection paths R1, R1', R1", R2, R3, R4.

For example, the processor 100 or its electronic circuit, respectively, is configured to exclude the transit times of ultrasonic pulses received via a particular reflection path R1, R1', R1", R2, R3, R4 from determining the flow $\Phi$ of gas, if a signal strength value of the particular reflection is below a set threshold value, indicative of fouling by dirt or debris deposited at the location of the respective reflection point P1, P1', P1", P21, P22, P3, P4. In an embodiment, the processor 100 or its electronic circuit, respectively, is configured to generate an alarm, if the signal strength of the ultrasonic pulses received via all the paths is below a defined threshold, e.g. set to 25% of the signal strength value of the ultrasonic pulse emitted by the respective ultrasonic transducer 11, 11*, 12, 11a, 12a, 11b, 12b. For example, the alarm is sent to an operator via a wired or wireless communication network.

Alternatively or in addition, the processor 100 or its electronic circuit, respectively, is configured to determine the flow $\Phi$ of gas using an average of the transit times or their contribution to the determining the flow $\Phi$ of gas, respectively, e.g. further applying a correction factor determined from the flow profile in the channel 2.

Figure 8B:
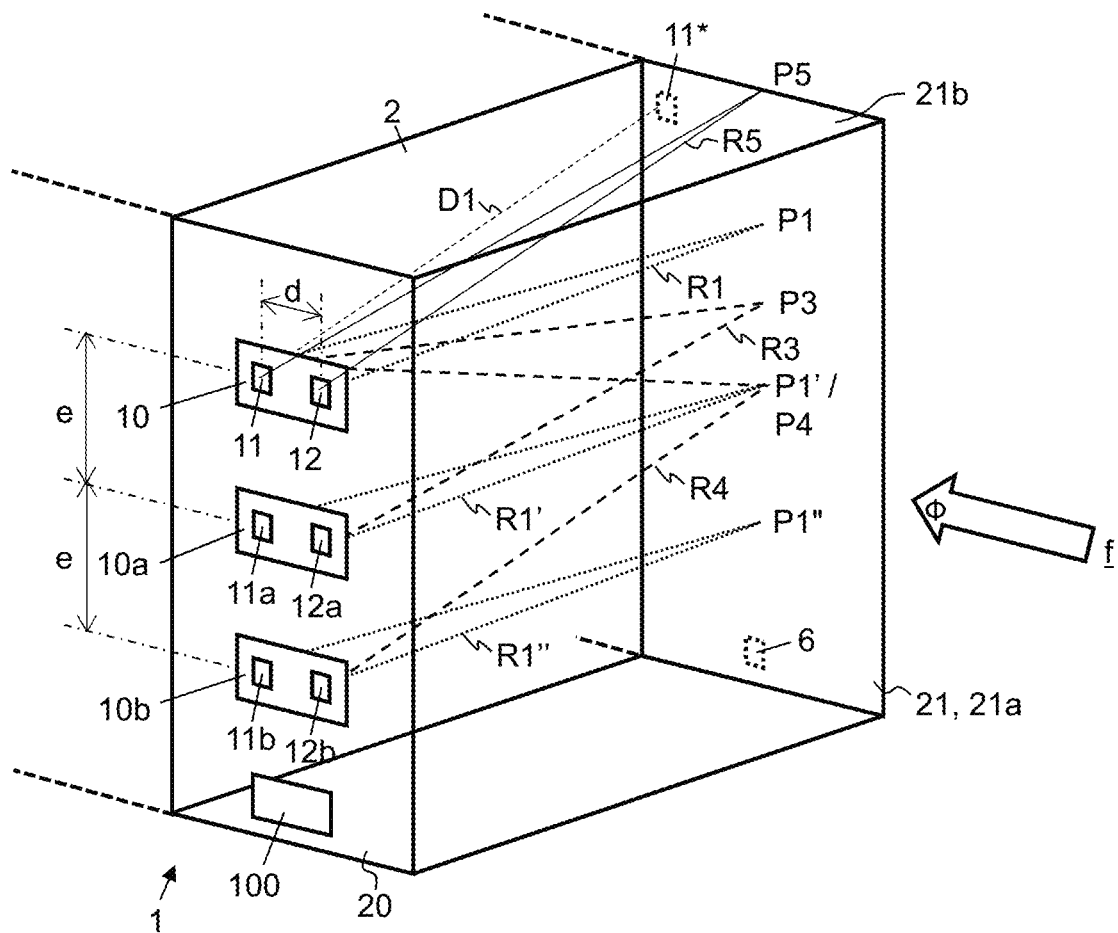
Figure 8C:
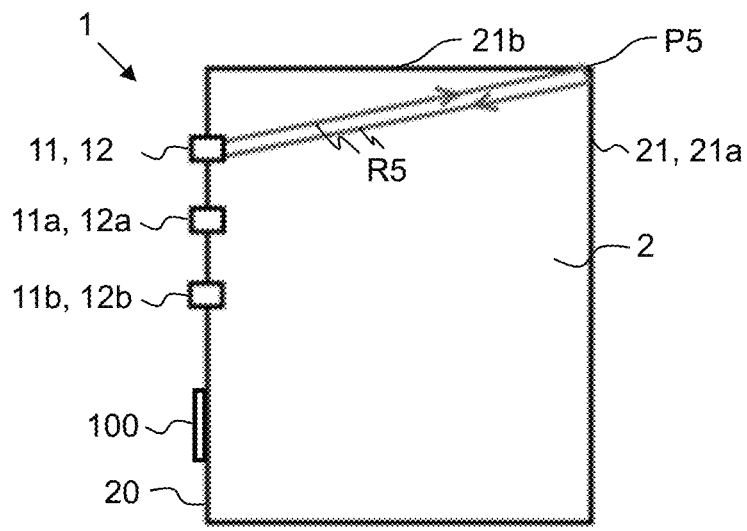

A further aspect or embodiment of the invention is exemplarily shown in FIGS. 8b and 8c. Therein, the channel 2 has an edge or edges formed between at least two inner walls 21a, 21b so of the channel 2 and a reflection path R1, R1', R1", R2, R3, R4, R5 with a reflection point R1, R1', R1", R2, R3, R4, R5 for ultrasonic waves is present. Preferably, at least one reflection point P5 for a reflection path R5 can be implemented by a reflecting area of an edge region formed by at least two inside walls 21a, 21b of the channel 2. This has the advantage that an already existing edge region of the channel 2 can be used as an efficient reflector P5 for ultrasonic waves with good directional or collimating retroreflecting properties. Preferably, the edge region is formed in a joining region of two or three substantially mutually vertical walls 21a, 21b of the channel 2, thereby using the edge region as a cornercube reflector P5 for the ultrasonic waves.

In particular, for a precise measurement using the transit times in such a configuration with at least one reflection point P5 for the reflection path R5, it is favourable to use in addition knowledge of the temperature of the fluid and/or the distance between the emitting and/or receiving ultrasonic transducer(s) 10, 11, 12 and the reflecting wall 21a, 21b.

Figure 9:
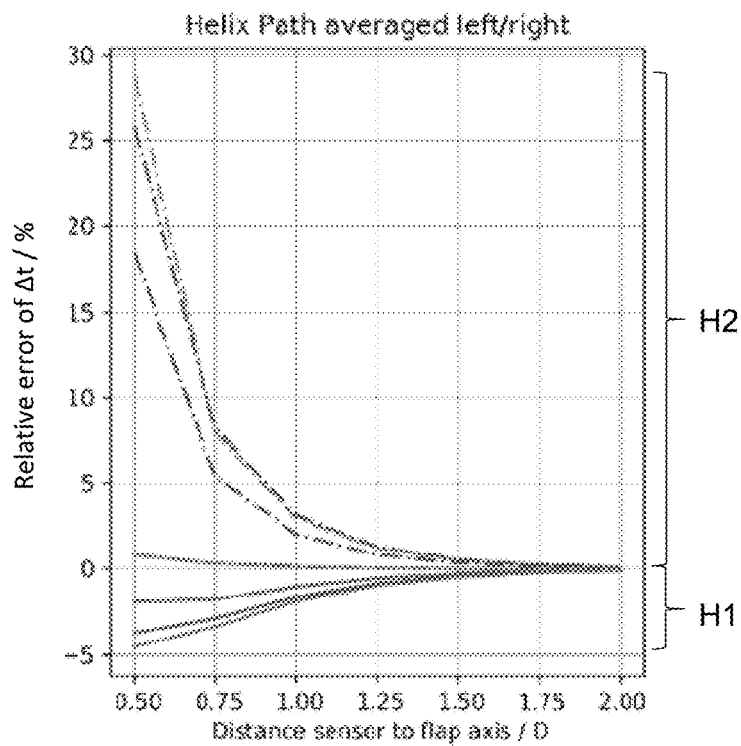
FIG. 9: shows a chart illustrating measurement errors resulting from measurements based on reflection paths of ultrasonic pulses having two reflections in the channel and determined for an ultrasonic flowmeter depending on the distance and location of the ultrasonic flowmeter with respect to a damper system.
Figure 10:
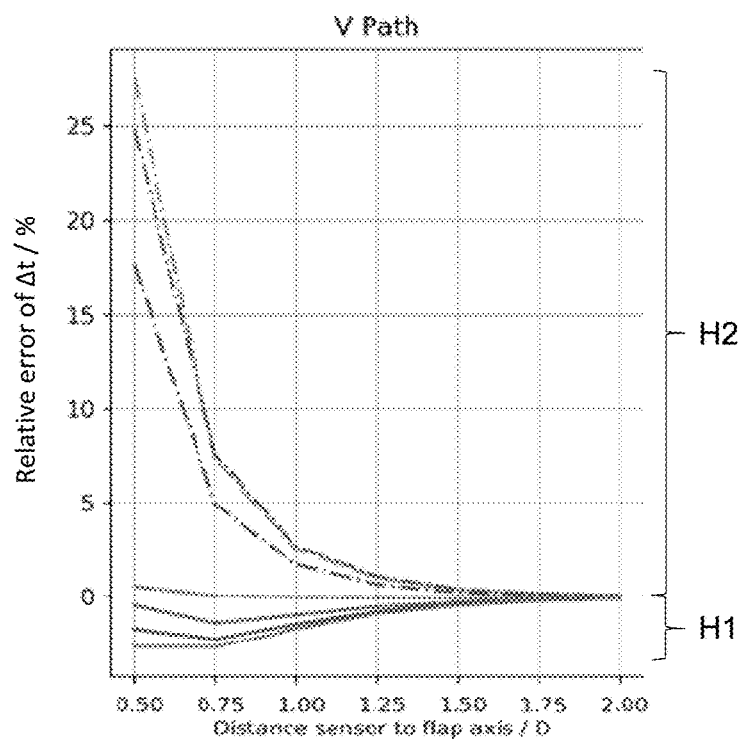
FIG. 10: shows a chart illustrating measurement errors resulting from measurements based on reflection paths of ultrasonic pulses having one reflection in the channel and determined for an ultrasonic flowmeter depending on the distance and location of the ultrasonic flowmeter with respect to a damper system.

FIGS. 9 and 10 illustrate the relative errors (in %) of the determined time differences $\Delta t = t_{down} - t_{up}$ of the measured downstream transit times $t_{down}$ and upstream transit times $t_{up}$, for different orifice settings of the damper 4, depending on a) whether the ultrasonic flowmeter 10 and its ultrasonic transducers 11, 12 are arranged on the side of the channel 2 forming the upper half H1 or the lower half H2, and b) the distance L between the downstream ultrasonic transducer 12 and the damper 4 with reference to the diameter D of the channel 2. FIG. 9 illustrates the measurements errors produced for transit times measured for reflections along reflections paths R2 with a twofold reflection on two reflection points P21, P22 (in FIG. 9 referred to as helix path). FIG. 10 illustrates the measurements errors produced for transit times measured for reflections along reflections paths R1 with a single reflection on a single reflection point P1 (in FIG. 10 referred to as V path). As is clearly evident from FIGS. 9 and 10, arranging the ultrasonic flowmeter 10 and its ultrasonic transducers 11, 12 on the side of the channel 2 forming the upper half H1 (where the damper blade 4 is movable downstream in flow direction f) produces significantly lower measurement errors.

Figure 11:
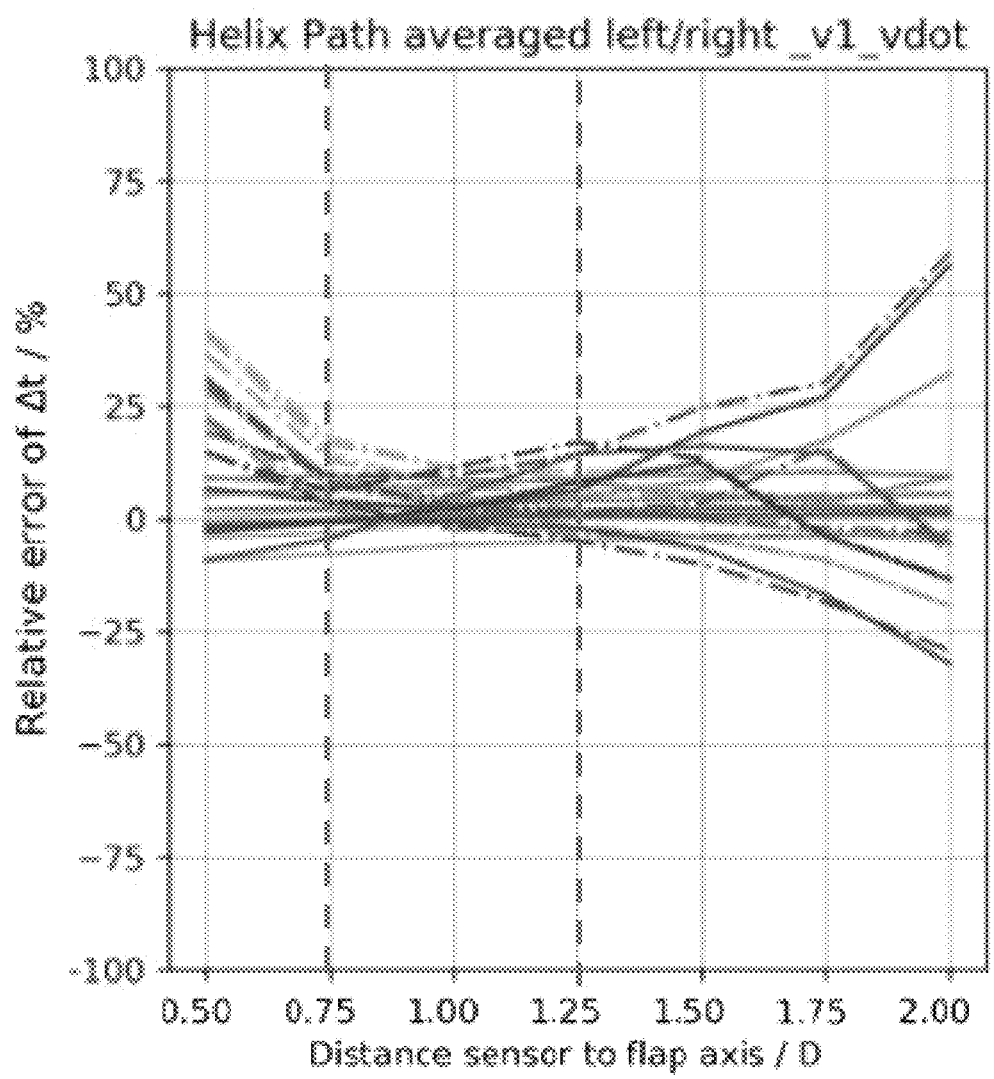
FIG. 11: shows a chart illustrating resulting measurement errors determined for an ultrasonic flowmeter depending on the distance of the ultrasonic flowmeter from the damper system.

FIG. 11 illustrates the relative errors (in %) of the determined time differences $\Delta t = t_{down} - t_{up}$ of the measured downstream transit times $t_{down}$ and upstream transit times $t_{up}$, for different orifice settings of the damper 4, depending on the distance L between the downstream ultrasonic transducer 12 and the damper 4 with reference to the diameter D of the channel 2. FIG. 11 illustrates the measurements errors produced for transit times measured for reflections along reflections paths R2 with a twofold reflection on two reflection points P21, P22 (in FIG. 11 referred to as helix path), whereby the ultrasonic flowmeter 10 and its ultrasonic transducers 11, 12 are arranged behind a disturbance, such as turbulence caused by a bend or curve of the channel 2. As is clearly evident from FIG. 11, arranging the ultrasonic flowmeter 10 such that its downstream ultrasonic transducer 12 has a distance L from the downstream ultrasonic transducer 12, within a range of 75% to 125% of the diameter D of the channel 2, produces comparably lower measurement errors than at distances L outside this range.

In an embodiment, the flow measurement system 1 further comprises a temperature sensor arranged and configured to measure a current (supply) temperature of the gas flowing through the channel 2. The temperature sensor is connected to the processor 100, and the processor 100 or its electronic circuit, respectively, is configured to calculate a current thermal energy transfer or thermal energy transfer rate using the determined flow $\Phi$ of gas and temperature of gas (and an additional return temperature of the gas determined by a further temperature sensor and optionally a humidity sensor to measure enthalpy).

In an embodiment, the processor 100 or its electronic circuit, respectively, is configured to determine the (supply and/or return) temperature of the gas by calculating the temperature from the (effective) speed of sound. More specifically, the temperature of the gas is calculated using the dependency of the speed of sound v from the temperature T: $v = 331$ m/s $+ T*0.6$ m/sK (meters per second and Kelvin). For added, accuracy (the effective speed of sound is also affected by other factors such as air pressure and humidity in second order), further parameters are used in the calculation, such as air pressure and humidity. Thus, using the known geometry/dimensions of the channel 2 (and the distance d between ultrasonic transducers) to determine the path length (distance travelled) of the respective ultrasonic pulses, the effective speed of sound is calculated from the average of the respective measured transit times of the ultrasonic pulses in and against flow direction f, and the temperature of the gas is calculated using said dependency of the speed of sound v from the temperature T.

In a further embodiment, particularly for cases of large channels 2 (ducts) and installation on channels 2 (ducts) in the field, the dependency of the speed of sound v from the temperature T of the gas is used to determine the dimensions of the channel 2, more specifically the diameter or width of a round or square/rectangular channel 2, respectively. For that purpose, the flow measurement system 1 comprises a temperature sensor 6 arranged in the channel 2 for measuring the temperature T of the gas. Using the measured temperature T, the processor 100 or its electronic circuit, respectively, is configured to calculate the speed of sound at that temperature T. Subsequently, the processor 100 or its electronic circuit, respectively, determines the path length (distance travelled) of the respective ultrasonic pulses, using the measured transit times of the ultrasonic pulses in and against flow direction f and the determined speed of sound, and calculates the dimensions of the channel 2, further using the known distance d between the respective ultrasonic transducers.

In a further embodiment, the processor 100 or its electronic circuit, respectively, is configured to control the thermal energy transfer or transfer rate by controlling the damper system 4 to adjust the orifice of the damper to regulate the flow $\Phi$ of gas through the channel, depending on a comparison of a set point and the determined current thermal energy transfer or transfer rate.

It should be noted that, in the description, examples have been described with reference to a few specific (illustrated) paths, however, one skilled in the art will understand that many more paths, including direct paths and reflection paths, can be included and considered in the flow measurement within the scope of the invention. Furthermore, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. A flow measurement system comprising an ultrasonic flowmeter for measuring a flow of a gas through a channel, the ultrasonic flowmeter comprising at least two ultrasonic transducers arranged at a distance from each other in a flow direction, when the ultrasonic flowmeter is fixed to the channel, and configured to emit an ultrasonic pulse into the channel and to receive an ultrasonic pulse in the channel along more than one path, and a processor connected to the at least two ultrasonic transducers,
wherein the processor is configured to determine and store transit times of ultrasonic pulses propagating in and against the flow direction along the more than one path in the channel, and to determine the flow of the gas using the transit times,
wherein the flow measurement system comprises a plurality of ultrasonic flowmeters arranged on a same wall at a distance in a direction normal to the flow direction, and
wherein in addition to ultrasonic transducers of a first ultrasonic flowmeter detecting ultrasonic pulses along reflection paths with single reflections, of ultrasonic pulses emitted by an ultrasonic transducer of the same first ultrasonic flowmeter, the ultrasonic transducers of the first ultrasonic flowmeter are further configured to detect reflections of ultrasonic pulses along reflection paths that are emitted by an ultrasonic transducer of a different second ultrasonic flowmeter.

2. The flow measurement system of claim 1, wherein a plurality of paths, for measuring the transit times of ultrasonic pulses propagating in and against the flow direction, are implemented using a plurality of direct paths, a plurality of reflection paths, or a combination of one or more direct paths and one or more reflection paths.

3. The flow measurement system of claim 1, wherein the at least two ultrasonic transducers are configured to receive at least one reflection of an ultrasonic pulse in the channel, and the processor is configured to determine and store transit times of ultrasonic pulses propagating in and against the flow direction along one or more reflection paths, each reflection path running via one or more reflection points on an inside wall of the channel, and to determine the flow of the gas using the transit times.

4. The flow measurement system of claim 1, wherein the processor is configured to determine and store the transit times of ultrasonic pulses propagating in and against the flow direction along a plurality of reflection paths of a plurality of reflections of an ultrasonic pulse emitted by one of the ultrasonic transducers on a plurality of reflection points on an inside wall of the channel.

5. The flow measurement system of claim 1, wherein the processor is configured to determine and store the transit times of ultrasonic pulses propagating in and against the flow direction along a plurality of reflection paths of a plurality of ultrasonic pulses emitted by different ultrasonic transducers.

6. The flow measurement system of claim 1, wherein the processor is configured to determine the flow of the gas further using signal strength values of the received ultrasonic pulses.

7. The flow measurement system of claim 6, wherein the processor is further configured to exclude the transit times of ultrasonic pulses received via a particular reflection path in determining the flow of the gas, if a signal strength value of the reflection via the particular reflection path is below a set threshold value.

8. The flow measurement system of claim 1, wherein the processor is further configured to determine a flow profile of the channel, using the transit times, and determine the flow of the gas using the flow profile.

9. The flow measurement system of claim 1, wherein the flow measurement system further comprises the channel, the ultrasonic flowmeter is fixed to the channel, and a damper system has a damper blade arranged in the channel downstream of the ultrasonic flowmeter.

10. The flow measurement system of claim 9, wherein the damper blade is rotatable about a damper rotation axis which divides a cross section of the channel into a first half and a second half, and the ultrasonic transducers are arranged on a same side of the channel forming either the first half of the cross section or the second half of the cross section.

11. The flow measurement system of claim 9, wherein the damper blade is rotatable about a damper rotation axis which divides a cross section of the channel into an upper half and a lower half, whereby in the upper half of the cross section the damper blade is movable downstream in the flow direction and in the lower half of the cross section the damper blade is movable upstream against the flow direction, and the ultrasonic transducers are arranged on a side of the channel forming the upper half of the cross section.

12. The flow measurement system of claim 9, wherein the ultrasonic transducers are arranged on a side of the channel along a longitudinal arrangement axis running in a symmetry plane of the damper blade that is normal to a damper rotation axis.

13. The flow measurement system of claim 9, wherein an ultrasonic transducer arranged downstream in the flow direction is arranged at a defined distance between its center axis and a cross sectional plane running through the damper blade in closed position, whereby the defined distance is within a range of 75% to 125% of a diameter of the channel.

14. The flow measurement system of claim 1, wherein the ultrasonic transducers are arranged on a side of the channel along a longitudinal arrangement axis parallel to a central axis of the channel.

15. The flow measurement system of claim 1, wherein the processor is further configured to determine a temperature of the gas using the transit times.

16. The flow measurement system of claim 1, wherein the flow measurement system further comprises a temperature sensor configured to determine a temperature of the gas in the channel, and the processor is configured to determine a diameter or width of the channel, using the transit times and the temperature of the gas.

17. The flow measurement system of claim 1, wherein each of the ultrasonic flowmeters uses the ultrasonic transducers to detect ultrasonic pulse paths with the single reflections at a single reflection point on the inside of an opposite wall of the channel.

18. The flow measurement system of claim 1, wherein at least one reflection point for a reflection path is implemented by a reflecting area of an edge region formed by at least two inside walls of the channel.

19. A method of measuring a flow of a gas through a channel, using an ultrasonic flowmeter which comprises at least two ultrasonic transducers and a processor connected to the at least two ultrasonic transducers, the method comprising:
fixing the ultrasonic flowmeter to the channel such that the at least two ultrasonic transducers are arranged at a distance from each other in a flow direction and configured to emit an ultrasonic pulse into the channel and to receive an ultrasonic pulse in the channel along more than one path;

determining and storing by the processor transit times of ultrasonic pulses propagating in and against the flow direction along the more than one path in the channel; and determining by the processor the flow of the gas using the transit times, wherein a plurality of ultrasonic flowmeters are arranged on a same wall at a distance in a direction normal to the flow direction, and wherein in addition to ultrasonic transducers of a first ultrasonic flowmeter detecting ultrasonic pulses along reflection paths with single reflections, of ultrasonic pulses emitted by an ultrasonic transducer of the same first ultrasonic flowmeter, the method comprises the ultrasonic transducers of the first ultrasonic flowmeter detecting reflections of ultrasonic pulses along reflection paths that are emitted by an ultrasonic transducer of a different second ultrasonic flowmeter.

20. The method of claim 19, wherein a plurality of paths, for measuring the transit times of ultrasonic pulses propagating in and against the flow direction, are implemented using a plurality of direct paths, a plurality of reflection paths, or a combination of one or more direct paths and one or more reflection paths.

21. The method of claim 19, wherein the at least two ultrasonic transducers are configured to receive at least one reflection of an ultrasonic pulse in the channel, and the method comprises the processor determining and storing transit times of ultrasonic pulses propagating in and against the flow direction along one or more reflection paths, each reflection path running via one or more reflection point on an inside wall of the channel, and determining the flow of the gas using the transit times.

22. The method of claim 19, wherein the method comprises the processor determining and storing the transit times of ultrasonic pulses propagating in and against the flow direction along a plurality of reflection paths of a plurality of reflections of an ultrasonic pulse emitted by one of the ultrasonic transducers on a plurality of reflection points on an inside wall of the channel.

23. The method of claim 19, wherein the method comprises the processor determining and storing the transit times of ultrasonic pulses propagating in and against the flow direction along a plurality of reflection paths of a plurality of ultrasonic pulses emitted by different ultrasonic transducers.

24. The method of claim 19, wherein determining the flow of the gas comprises the processor further using signal strength values of the received ultrasonic pulses.

25. The method of claim 23, wherein the method comprises the processor excluding the transit times of ultrasonic pulses received via a particular reflection path in determining the flow of the gas, if a signal strength value of the reflection via the particular reflection path is below a set threshold value.

26. The method of claim 19, wherein the method further comprises the processor determining a flow profile of the channel, using the transit times, and determining the flow of the gas comprises the processor using the flow profile.

27. The method of claim 19, wherein the method further comprises the processor determining a temperature of the gas using the transit times.

28. The method of claim 19, wherein a temperature sensor is configured to determine a temperature of the gas in the channel, and the method further comprises the processor determining a diameter or width of the channel, using the transit times and the temperature of the gas.

29. A non-transitory computer-readable medium having stored thereon computer program code, which when accessed and executed by a processor of an ultrasonic flowmeter for measuring a flow of a gas through a channel, the ultrasonic flowmeter comprising at least two ultrasonic transducers connected to the processor and arranged at a distance from each other in a flow direction, when the ultrasonic flowmeter is fixed to the channel, and configured to emit an ultrasonic pulse into the channel and to receive an ultrasonic pulse in the channel along more than one path, causes the processor to at least:

determine and store transit times of the ultrasonic pulses propagating in and against the flow direction along the more than one path in the, and determine the flow of the gas using the transit times.

30. A variable air volume system for heating, ventilating, and air conditioning, the variable air volume system comprising the flow measurement system according to claim 1.

* * * * *